United States Patent [19]
Schramm

[11] Patent Number: 6,005,494
[45] Date of Patent: Dec. 21, 1999

[54] ENERGY MINIMIZATION ROUTING OF VEHICLE USING SATELLITE POSITIONING AN TOPOGRAPHIC MAPPING

[75] Inventor: Scott W. Schramm, Novi, Mich.

[73] Assignee: Chrysler Corporation, Auburn Hill, Mich.

[21] Appl. No.: 08/979,334

[22] Filed: Nov. 24, 1997

Related U.S. Application Data

[63] Continuation of application No. 08/732,625, Oct. 16, 1996, abandoned.

[51] Int. Cl.$^6$ .................................................... G08G 1/123
[52] U.S. Cl. ...................... 340/995; 340/988; 364/444.1; 364/449.4
[58] Field of Search ................................. 340/995, 990, 340/988; 364/444.1, 449.4

[56] References Cited

U.S. PATENT DOCUMENTS

| | | | |
|---|---|---|---|
| 5,303,159 | 4/1994 | Tamai et al. | 364/449.4 |
| 5,359,529 | 10/1994 | Snider | 364/449.4 |
| 5,504,482 | 4/1996 | Schreder | 340/988 |
| 5,508,930 | 4/1996 | Smith, Jr. | 364/444.1 |
| 5,521,826 | 5/1996 | Matsumoto | 340/995 |
| 5,568,390 | 10/1996 | Hirota et al. | 340/995 |
| 5,574,649 | 11/1996 | Levy | 340/988 |

*Primary Examiner*—Jeffrey A. Hofsass
*Assistant Examiner*—John Tweel, Jr.
*Attorney, Agent, or Firm*—Roland A. Fuller III

[57] ABSTRACT

A system for determining an energy-optimum route for a vehicle to take between an origin and a destination includes a computer onboard the vehicle. A global positioning system (GPS) transceiver is also onboard the vehicle for receiving vehicle position data from the satellite. The computer access a database containing both topographical map information and vehicle energy consumption data, and based thereon the computer determines and displays an energy-optimum route. The computer can also display information regarding nearby refueling stations. Also, the vehicle energy consumption data can be modified as appropriate based on the operation of the vehicle, to account for the particular vehicle's actual fuel consumption characteristics.

20 Claims, 5 Drawing Sheets

ENERGY MINIMIZATION ROUTING OF VEHICLE USING SATELLITE POSITIONING AN TOPOGRAPHIC MAPPING

This is a continuation of U.S. patent application Ser. No. 08/732,625, filed Oct. 16, 1996, now abandoned.

FIELD OF INVENTION

The present invention relates generally to systems and methods for minimizing the energy consumption of vehicles, and more particularly to systems and methods for determining energy-optimizing routing of vehicles.

BACKGROUND OF THE INVENTION

Making vehicles ever more energy-efficient has been and continues to be a focal point of automotive design. Energy efficient vehicles consume less of the earth's non-renewable hydrocarbon resources, and are also less expensive to operate than vehicles that are not energy efficient.

In addition to the above considerations, energy efficiency is likely to grow in importance in the future. In particular, many future vehicles are likely to be propelled not by internal combustion, but by electric propulsion systems that presently have, and at least into the near future will have, comparatively low energy capacities compared to conventional internal combustion systems. Further, many future vehicles might possibly incorporate a hybrid form of electric propulsion and internal combustion. In any case, the conservation of the vehicles' onboard energy supply will be crucial to convenient operation of the vehicles.

As recognized by the present invention, advances in energy conservation can be realized not only by improving the design of the vehicles and their propulsion systems, but also by intelligently operating the vehicles, apart from any particular vehicle design. More specifically, the present invention recognizes that it is usually the case that more than one route exists between a vehicle origin and a desired destination, and that energy conservation can be enhanced by selecting the most energy efficient route. For example, two routes might exist that connect an origin and a destination, but one route might not be as direct and hence would be longer (and, thus, require higher energy consumption) than the other route. Or, two routes of approximately equal length might exist between two points, but the topography of one route might be relatively rough, whereas the topography of another route might be relatively flat and consequently require less energy to negotiate than the rougher route.

With the above considerations in mind, the present invention further recognizes that modern computers, coupled to newly-compiled topographical map databases and to global positioning satellite (GPS) systems, can be used to select and present energy-efficient routes between operator selected origins and destinations. Still further, as recognized herein the energy consumption characteristics of a vehicle can depend on the manner in which the vehicle is operated by its driver, and on peculiarities of the vehicle itself. Accordingly, it would be advantageous to account for a vehicle's particular energy consumption characteristics, on an individual vehicle basis.

Accordingly, it is an object of the present invention to provide a system for determining an optimum route between an origin and a destination that accounts for topographical variations among routes. Another object of the present invention is to provide a system for determining an optimum route between an origin and a destination that receives precise current vehicle position from a GPS system. Still another object of the present invention is to provide a system for determining an optimum route for a vehicle which accounts for the way in which a particular driver operates the vehicle, and for the particular energy consumption characteristics of the vehicle. Yet another object of the present invention is to provide a system for determining an optimum route that is easy to use and cost-effective.

SUMMARY OF THE INVENTION

A system is disclosed for determining an energy efficient route between an origin and a destination. The system includes a database containing topographic information and a computer in communication with the database. As disclosed in detail below, the computer receives the origin and destination and accesses the database to determine possible routes existing between the origin and the destination. Each possible route is characterized by an energy consumption, and the computer accesses the topographic information and determines a select route having a minimum energy consumption among the possible routes.

In a preferred embodiment, a receiver receives location information from a satellite, with the receiver being in communication with the computer for sending location information thereto. In a particularly preferred embodiment, a vehicle is included for holding the receiver. The location information consequently is representative of the location of the vehicle on the earth. Moreover, the vehicle is characterized by an energy amount when the vehicle is located at the origin, and the computer determines whether the minimum energy consumption is less than the energy amount.

Desirably, each route includes one or more segments, and the computer determines an energy consumption for each segment. As intended herein, the computer adds the energy consumptions of the segments of a route to determine the energy consumption of the route. A display can be provided to present route information thereon. The energy consumption for each segment is preferably provided by an energy consumption source such as a table, and the source can be updated based on the operation of the vehicle.

Additionally, the database can include information representative of commercial energy purchasing facilities (CEPFs). At the user's option, when the minimum energy consumption is greater than the energy amount, the computer causes the display to present information representative of one or more CEPFs and one or more possible routes other than the select route.

In another aspect, a computer program device includes a computer program storage device readable by a digital processing system, and a program means art the program storage device. The program means embodies logic means that are recognizable by the digital processing system for performing method steps for determining an energy efficient route between an origin and a destination. These logic means include logic means for receiving the origin and destination, and logic means for accessing a database containing topographic information of a plurality of possible routes from the origin to the destination, with each possible route being characterized by an energy consumption. Further, the logic means include logic means for determining a select route having a minimum energy consumption among the possible routes.

In still another aspect, a vehicle includes a receiver for receiving vehicle location information from a satellite, and the vehicle also includes a database containing topographic information. Moreover, the vehicle includes a vehicle energy consumption information source containing energy consumption information relative to the vehicle. Additionally, the vehicle includes a computer in communication with the database, vehicle energy consumption source, and receiver, so that the computer receives an origin and a destination and accesses the database to determine possible routes existing between the origin and the destination. Each possible route is characterized by an energy consumption, and the computer accesses the topographic information and the vehicle energy consumption source to determine a select route having a minimum energy consumption among the possible routes. A display is connected to the computer for causing the display to present information representative of the select route.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
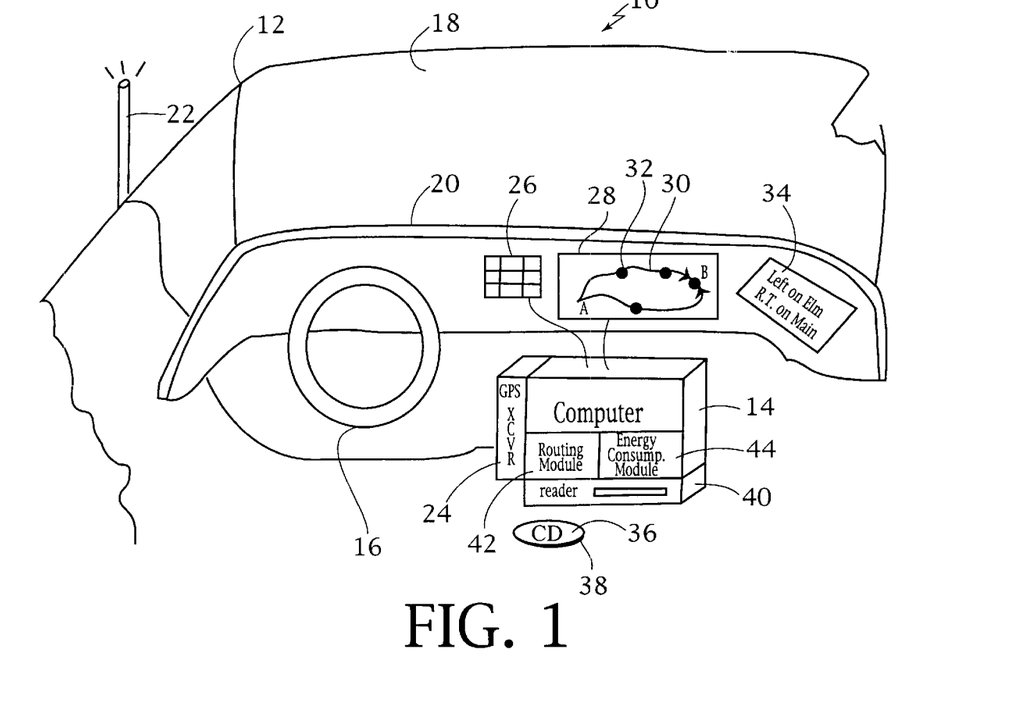
FIG. 1 is a schematic diagram of a vehicle incorporating the energy minimization system of the present invention.

Referring initially to FIG. 1, a vehicle energy conservation system is shown, generally designated 10, which includes a vehicle 12 and a computer 14 that is onboard the vehicle 12. As shown, the vehicle 12 includes a conventional steering wheel 16, windshield 18, and dashboard 20. Per the present invention, a radiofrequency (rf) antenna 22 is mounted on the vehicle 12, and the antenna 22 is electrically connected as shown to a satellite-implemented global positioning system (GPS) transceiver 24 that is in communication with the computer 14. Accordingly, the computer 14 can receive information from the transceiver 24 that represents the location of the vehicle 12 on the earth's surface.

Additionally, the computer 14 is associated with one or more peripheral devices, including a data entry device such as a keypad 26. Further, a graphical display 28 can be associated with the computer 14 for displaying one or more routes 30 between an operator-selected origin "A" and an operator-selected destination "B". As shown in FIG. 1, the graphical display 28 can also present icons 32 that represent commercial energy purchasing facilities (CEPFs), such as, e.g., gasoline filling stations. It is to be understood that for vehicles that are battery powered or are powered by a hybrid form of battery-internal combustion, the CEPFs can include battery recharging facilities.

Moreover, FIG. 1 shows that the computer 14 can be associated with an alpha-numeric display 34 that presents routing directions. For example, as shown in FIG. 1 the alpha-numeric display 34 can present directions such as "LEFT ON ELM, RIGHT ON MAIN". If desired, the functions of the graphical display 28 and alpha-numeric display 34 can be integrated into a single display. The keypad 26, graphical display 28, and alpha-numeric display 34 can be conveniently mounted on the dashboard 20 as shown, or on some other suitable surface of the vehicle 12. In one preferred embodiment, the displays 28, 34 are flat panel displays such as light emitting diode (LED) displays or liquid crystal displays (LCD), although other display structures (e.g., cathode ray tubes) equivalently can be used.

As additionally shown, the computer 14 is associated with a topographical map electronic database 36 which advantageously can be stored on a compact disk (CD) 38. In accordance with principles well-known in the art, data is transferred to and from the CD 38 by an associated CD reader 40, with the CD reader 40 being in data communication with the computer 14. It is to be understood that the topographical map database 36 can be stored on other media, e.g., a hard disk drive in the computer 14. The topographical map content of the database 36 can be obtained from the U.S. Geological Survey.

Completing the description of FIG. 1, the computer 14 includes a routing module 42 and an energy consumption module 44. As disclosed more fully below, the modules 42, 44 cooperate to determine an energy efficient route between the origin "A" and destination "B" of possible routes that exist in the topographical map database 36.

It is to be understood that the modules 42, 44 are implemented on a device medium. In one embodiment, the device medium is implemented by logic circuits on a chip in the computer 14. Alternatively, the modules 42, 44 can be implemented by a circuit board (not shown), and the operative components of the modules 42, 44 accordingly would be electronic components on the circuit board.

It is to be still further understood that the operations of the modules 42, 44 described below in reference to FIGS. 2-5 could be embodied in a device medium such as software, i.e., in machine-readable form and stored on a computer program storage device, such as the CD 36 shown in FIG. 1. In other words, FIGS. 2-5 illustrate the structures of the modules of the present invention as might be embodied in computer program software or in logic circuits. Those skilled in the art will appreciate that FIGS. 2-5 illustrate the structures of computer program code elements that function according to this invention. Manifestly, the invention is practiced in its essential embodiment by a machine component that renders the computer program code elements in a form that instructs a digital processing apparatus (that is, a computer) to perform a sequence of function steps corresponding to those shown in the Figures.

When embodied in software, these instructions may reside on a program storage device including a data storage medium, such as can be found on a computer floppy diskette, on semiconductor devices, on magnetic tape, on optical disks, on a DASD array, on magnetic tape, on a conventional hard disk drive, on electronic read-only memory or on electronic random access memory, or other appropriate data storage device. In an illustrative embodiment of the invention, the computer-executable instructions may be lines of compiled $C^{++}$ language code. In any case, apart from the particular computer program storage device (i.e., firmware logic circuits or software) that embodies the modules 42, 44, as intended by the present invention the modules 42, 44 establish a program means which embodies logic means that are recognizable by the computer 14 to perform the method steps disclosed below.

Figure 2:
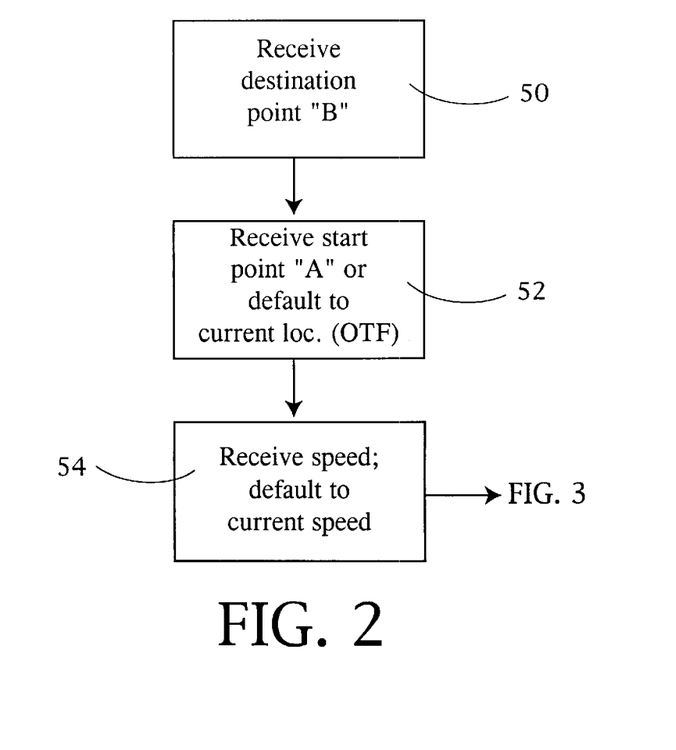
FIG. 2 is a flow chart showing the data input steps.
Figure 3:
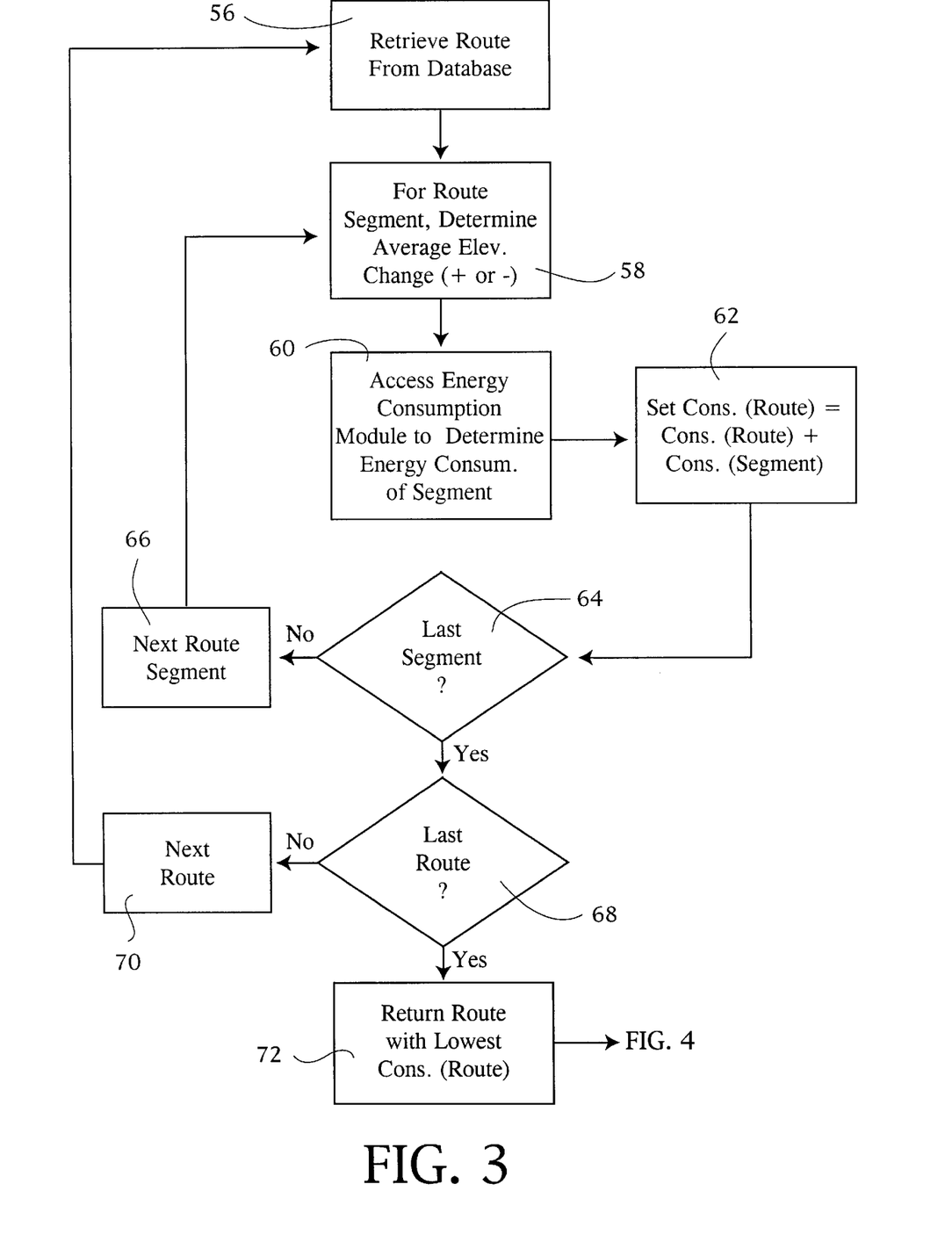
FIG. 3 is a flow chart showing the computer-implemented steps for selecting the optimum route between an origin and a destination.

Now referring to FIGS. 2 and 3, the logic of the routing module 42 can be seen. Commencing at block 50, the logic receives the destination point "B". Specifically, the operator can input the destination point "B" by appropriately inputting the latitude and longitude of the point "B", or the name of the point "B", or by clicking a mouse over a display of the point "B" on the display 28 shown in FIG. 1. Moving to block 52, the logic likewise receives the origination (i.e., start) point "A". If desired, the operator can indicate that the origination point "A" is to default to the current location of the vehicle 12. In such an instance, the computer 14 accesses the current location of the vehicle 12 by accessing the GPS transceiver 24 (FIG. 1).

Next, at block 54 of FIG. 2, the logic receives the desired average speed at which the operator intends to drive vehicle to the destination point "B". If desired, the operator may indicate a desire to select, as a default, the current speed of the vehicle 12. Accordingly, the computer 14 would access the speedometer of the vehicle 12 to set the default speed at block 54.

Referring now to FIG. 3, after receiving the inputs described above the routing module 42 retrieves from the database 36 (FIG. 1) a route between the origination point "A" and the destination point "B". It is to be understood that not all possible routes that are stored on the map of the database 36 need be retrieved. Rather, a route screening strategy can be employed to automatically screen routes that are of a greater length than a predetermined length, e.g., greater than 20% longer than the shortest available route, or greater than 30% longer than the straight line distance between the origination point "A" and the destination "B".

It is to be further understood that each route retrieved is regarded by the logic below as a series of contiguous route segments. For example, each route segment can be one mile in length. Thus, a route between points "A" and "B" that is one hundred miles in length would be composed of 100 route segments, while an alternate route of, say, one hundred five miles in length would be composed of 105 segments, and so on.

Accordingly, at block 58 the logic determines, starting with the first route segment of a first route, the average elevation change, either plus or minus (±Δ) (or zero), as indicated by the topographical map contained in the database 36. Then, at block 60 the logic accesses the energy consumption module described below to determine the energy consumption that would be required for the vehicle 12 to traverse the route segment under test at the speed that was input at block 54 of FIG. 2. In the preferred embodiment, the energy consumption module 44 is table-driven, but it is to be understood that equivalent algorithms can be used in lieu of the tables disclosed herein.

Figure 6:
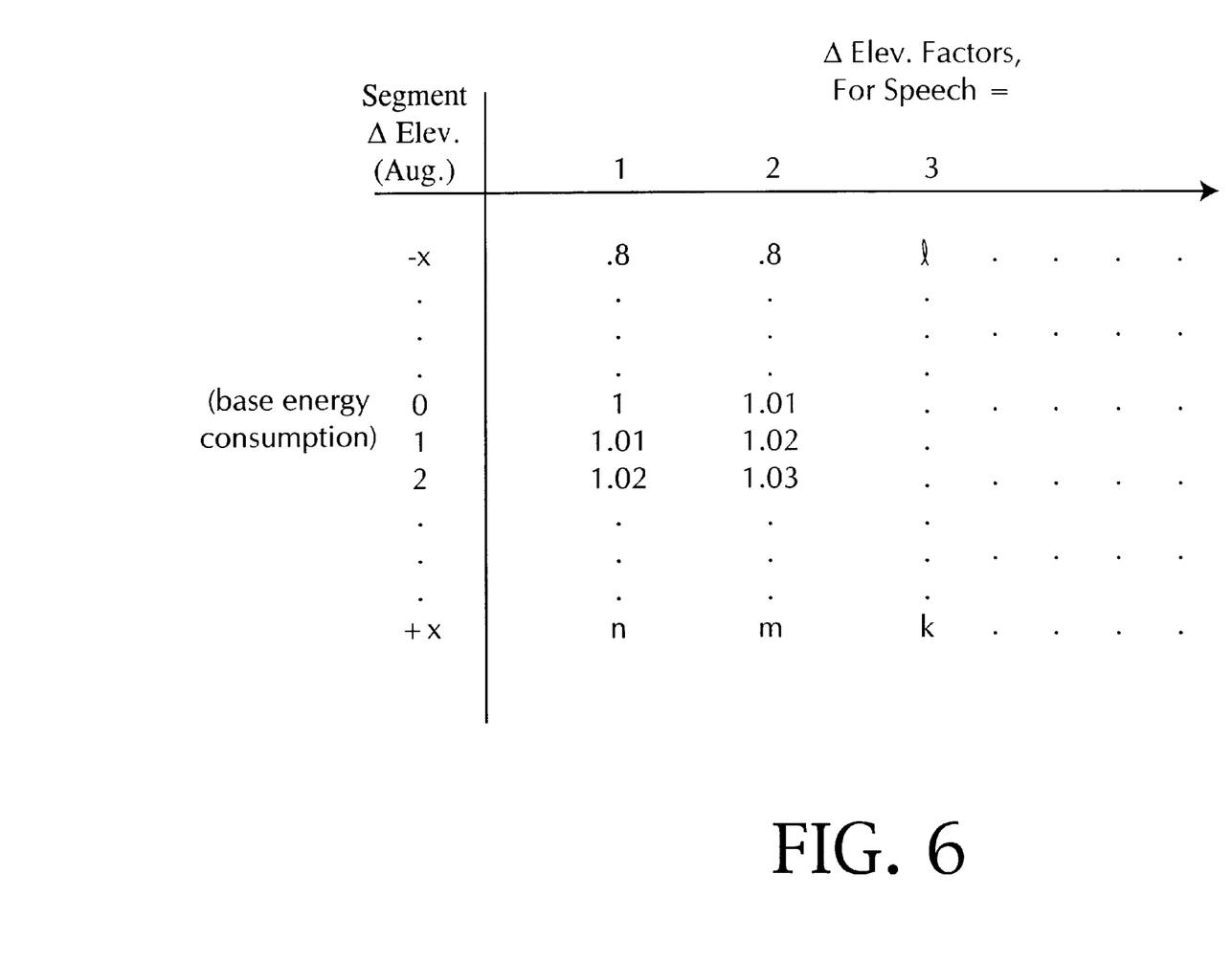
FIG. 6 is a table showing an example of an electronically-stored vehicle energy consumption table.

Referring briefly to FIG. 6, an example of an energy consumption table of the energy consumption module 44 includes a first column entitled "segment Δelev. (avg.)". It is to be understood that the entries in this column represent average elevational changes, from a high negative value denoted –X, through zero, to a high positive value denoted +X. Thus, FIG. 6 is an example of what can be thought of as a vehicle 12 energy consumption information source. Also, the example table shown in FIG. 6 includes speed columns headed "1", "2", "3". . . , with the headings representing the desired speed of the vehicle 12 along the route segment. Thus, the step shown at block 60 of FIG. 3 is undertaken in one embodiment by selecting, from the table shown in FIG. 6, the energy consumption value in the row corresponding to the average elevation change determined at block 58 of FIG. 3 and the column corresponding to the speed that was input at block 54 of FIG. 2.

Accordingly, as intended by the present invention, the numerals under the speed column headings represent energy consumption units, the default values of which are empirically determined, preferably on a vehicle model-by-model basis. As disclosed further below in reference to FIG. 5, the entries of the table shown in FIG. 6 can be updated as the energy consumption module 44 "learns" about the actual energy consumption of the particular vehicle 12.

Returning to FIG. 3, and more specifically to block 62, the logic of the routing module 42 sets a variable "consumption$_{route}$" (initialized at zero) to be equal to "consumption$_{route}$" plus the energy consumption ("consumption$_{segment}$") determined at block 60. Then, the routing module enters states 64–70, which indicate that the process described above is performed in a so-called "DO" loop for each segment of each possible screened route, and for each route.

More particularly, at decision diamond 64 it is determined whether the segment under test is the last segment of the route, and if not the logic retrieves the next segment at block 66 and then loops back to block 58. Otherwise, the logic determines at decision diamond 68 whether the route under test is the last route that has been retrieved within the constraints of the screen described above, and if not the logic retrieves the next route at block 70 and then loops back to block 56 to retrieve the route from the database 36. On the other hand, when it is determined at decision diamond 68 that the last route has indeed been tested, the logic returns the route with the lowest overall energy consumption at block 72. From block 72, the logic proceeds to FIG. 4.

Figure 4:
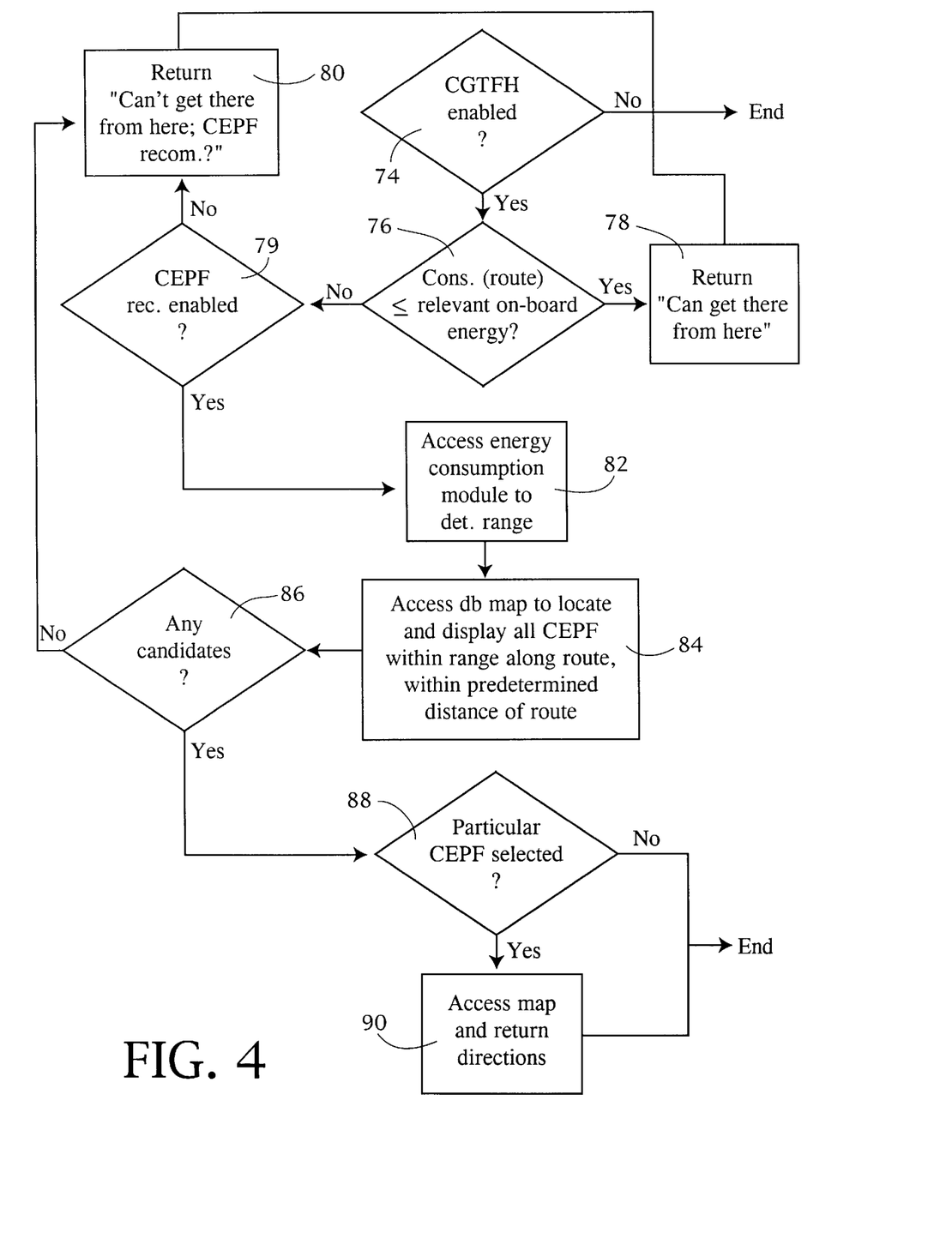
FIG. 4 is a flow chart showing the computer-implemented steps of the "can't get there from here" (CGTFH) routine of the present invention.

Commencing at decision diamond 74 in FIG. 4, the logic of the "can't get there from here" ("CGTFH") subroutine of the routing module 42 determines whether CGTFH has been enabled. If not, the CGTFH subroutine ends. On the other hand, if CGTFH has been enabled, the logic proceeds to decision diamond 76 to determine whether the energy consumption (consumption$_{route}$) of the route returned at block 72 of FIG. 3 is less than or equal to the relevant onboard energy reserve of the vehicle 12. By "relevant onboard energy reserve" is meant the expected energy reserve of the vehicle 12 at the origination point "A".

If it is determined that the energy consumption of the route is greater than or equal to the relevant onboard energy reserve of the vehicle 12, the logic moves to block 78 to return a signal indicating that the vehicle 12 has sufficient energy to travel from the origination point "A" to the destination point "B" at the desired speed. If, however, the vehicle 12 does not have sufficient energy as determined at decision diamond 76, the logic moves to decision diamond 79 to determine whether the operator has enabled the CEPF recommendation routine of steps 82–90 below. If CEPF recommendation is not enabled (to thereby avoid nuisance recommendations when none are desired), the logic moves to block 80 to return a signal indicating that the vehicle 12 has insufficient energy to travel from the origination point "A" to the destination point "B" at the desired speed. Also, at block 80 the logic can cause the display 28 (FIG. 1) to present alternate routes, and then the process ends.

If the enable test at decision diamond 79 is positive, however, the logic proceeds to block 82 to access the energy consumption module 44 (FIGS. 1 and 5) to determine the range of the vehicle 12 at the origination point "A", based on the relevant onboard energy. Next moving to block 84, the logic accesses the map of the database 36 to locate and display all CEPFs within the range of the vehicle 12 along the route returned at block 72 of FIG. 3 that are within a predetermined threshold distance (e.g., one mile) of the route.

Then, at decision diamond 86, it is determined whether any candidate CEPFs exist along the route. If not, the logic loops back to block 80, but otherwise the logic moves to decision diamond 88 to determine whether a particular CEPF has been selected by the operator in response to the display generated at block 84. If it has, the logic moves to block 90 to access the map of the database 36 and return directions to the selected CEPF. From block 90, or from decision diamond 88 if the test there is negative, the logic ends.

Figure 5:
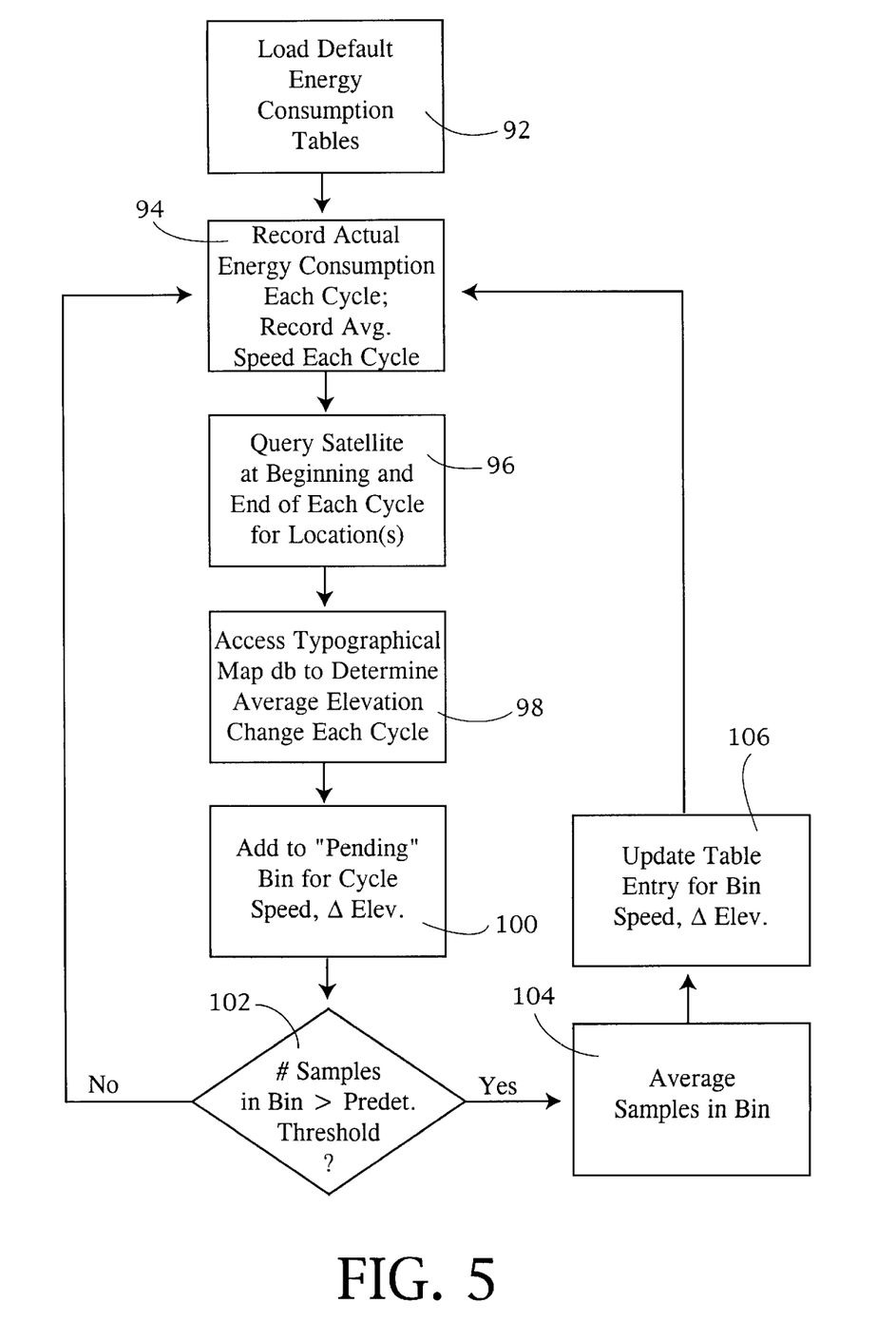
FIG. 5 is a flow chart showing the computer-implemented steps for modifying the vehicle energy consumption information to account for actual vehicle operation.

Now referring to FIG. 5, which shows the logic of the energy consumption module 44 in updating the energy consumption table shown in FIG. 6 and described previously in reference to FIG. 3, at block 92 the logic loads default energy consumption unit values into energy consumption table shown in FIG. 6. Alternatively, the energy consumption units can be factors which, when multiplied by an empirically-determined base energy consumption value, produce an energy consumption unit value for the particular elevational change and speed represented by the factor.

Next, at block 94 the actual energy consumption of the vehicle 12, along with the average speed of the vehicle 12, is recorded each cycle, e.g., every minute. To obtain the actual energy consumption, the logic can access the fuel gauge, battery discharge meter, or other fuel consumption instrument of the vehicle 12. Moving to blocks 96 and 98, the elevational change of the segment traversed during the cycle is recorded as follows. At block 96, the computer 14 causes the GPS transceiver 24 (FIG. 1) to query the satellite at the beginning and end of the cycle to obtain the start point and end point of the segment. Then, at block 98 the topographical database 36 is accessed using the information obtained at block 96 to correlate the segment with the appropriate segment stored in the database 36. Recall that the database 36 includes elevational change entries which are accessed to thereby determine the elevation characteristics of the segment traversed during the cycle.

Moving to block 100, the data obtained at blocks 94 and 98 is added to a pending bin that represents actual energy consumption for the particular speed and elevational change under test. Then, it is determined at decision diamond 102 whether the number of samples in the bin accessed at block 100 exceeds a predetermined threshold, e.g., five samples. If it does, the actual energy consumption values for the samples in the bin are averaged at block 104, and then the energy consumption table shown in FIG. 6 is updated at block 106 by replacing the energy consumption value for the test speed and elevational change with the value determined at block 104. From block 104, or from decision diamond 102 if the number of samples was determined to be insufficient to render a satisfactory update, the logic loops back to block 94 for the next cycle.

While the particular ENERGY MINIMIZATION ROUTING OF VEHICLE USING SATELLITE POSITIONING AND TOPOGRAPHIC MAPPING as herein disclosed and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

I claim:

1. A system for determining an energy efficient route for a motor vehicle, the route having an origin and a destination, comprising:

a database containing route information, where each possible route comprises one or more segments, and ground elevation information, where each segment of each possible route is characterized by an average elevational change value; and a computer in communication with the database, the computer receiving the origin and destination, and accessing the database to determine possible routes existing between the origin and the destination, the computer further accessing the elevation information, determining an energy consumption for each segment based at least in part on the average elevational change value for the segment, adding the energy consumptions of the segments of a route to determine the energy consumption for the route, and determining a select route having a minimum energy consumption among the possible routes.

2. The system of claim 1, further comprising a receiver for receiving location information from a satellite, the receiver being in communication with the computer for sending location information thereto.

3. The system of claim 2, further comprising a vehicle holding the receiver, the location information being representative of the location of the vehicle on the earth.

4. The system of claim 3, wherein the vehicle is characterized by an energy amount when the vehicle is located at the origin, and wherein the computer determines whether the minimum energy consumption is less than the energy amount.

5. The system of claim 4, further comprising a display on the vehicle, the computer causing the display to present information representative of the select route and whether the minimum energy consumption is less than the energy amount.

6. The system of claim 5, wherein the database includes information representative of commercial energy purchasing facilities (CEPFs), and wherein when the minimum energy consumption is greater than the energy amount, the computer causes the display to present information representative of one or more CEPFs and one or more possible routes other than the select route.

7. The system of claim 3, further comprising a vehicle energy consumption information source containing energy consumption information relative to the vehicle, the computer accessing the energy consumption information to determine the select route.

8. The system of claim 7, wherein the source is modified based upon the operation of the vehicle.

9. A computer program device medium residing in a motor vehicle, comprising:

a computer program storage device readable by a digital processing system; and a means on the program storage device and embodying logic means recognizable by the digital processing system for performing method steps for determining an energy efficient route between an origin and a destination, comprising:

logic means for receiving the origin and destination;

logic means for accessing a database containing route information for a plurality of possible routes from the origin to the destination, each possible route comprises one or more segments, and ground elevation information, where each segment of each possible route is characterized by an average elevational change value;

logic means for determining an energy consumption for each segment based at least in part on the average elevational change value for the segment, and for adding energy consumptions of the segments of a route to determine the energy consumption for the route; and logic means for determining a select route having a minimum energy consumption among the possible routes.

10. The computer program device medium of claim 9, in combination with a receiver for receiving location information from a satellite, the receiver being in communication with the program means for sending location information thereto.

11. The combination of claim 10, in further combination with a vehicle, the vehicle holding the receiver, the location information being representative of the location of the vehicle on the earth.

12. The combination of claim 11, wherein the vehicle is characterized by an energy amount when the vehicle is located at the origin, and the computer program device further includes:

logic means for determining whether the minimum energy consumption is less than the energy amount.

13. The combination of claim 12, in further combination with a display on the vehicle, and the computer program product further includes:

logic means for causing the display to present information representative of the select route and whether the minimum energy consumption is less than the energy amount.

14. The combination of claim 13, wherein the database includes information representative of commercial energy purchasing facilities (CEPFs), and the computer program device further includes:

logic means for, when the minimum energy consumption is greater than the energy amount, causing the display to present information representative of one or more CEPFs and one or more possible routes other than the select route.

15. The combination of claim 11, in further combination with a vehicle energy consumption information source containing energy consumption information relative to the vehicle, the computer program device including:

logic means for accessing the source to determine the select route based on the energy consumption information.

16. The combination of claim 15, wherein the computer program device includes:

logic means for modifying the source based upon the operation of the vehicle.

17. A vehicle, comprising:

a receiver for receiving vehicle location information from a satellite;

a database containing route information, where each possible route comprises one or more segments, and elevation information, where each segment of each possible route is characterized by an average elevational change value;

a vehicle energy consumption information source containing energy consumption information relative to the vehicle;

a computer in communication with the database, vehicle energy consumption source, and receiver, the computer receiving an origin and a destination, the computer accessing the database to determine possible routes existing between the origin and the destination, the computer further accessing the elevation information and the vehicle energy consumption source, determining an energy consumption for each segment based at least in part on the average elevational change value for the segment, adding the energy consumptions of the segments of a route to determine the energy consumption for the route and determining a select route having a minimum energy consumption among the possible routes; and a display on the vehicle, the display being connected to the computer for causing the display to present information representative of the select route.

18. The vehicle of claim 17, wherein the vehicle is characterized by an energy amount when the vehicle is located at the origin, and wherein the computer determines whether the minimum energy consumption is less than the energy amount.

19. The vehicle of claim 18, wherein the database includes information representative of commercial energy purchasing facilities (CEPFs), and wherein when the minimum energy consumption is greater than the energy amount, the computer causes the display to present information representative of one or more CEPFs and one or more possible routes other than the select route.

20. The vehicle of claim 17, wherein the vehicle energy consumption source is modified based upon the operation of the vehicle.

* * * * *